US010080076B2

(12) United States Patent
Karasawa et al.

(10) Patent No.: US 10,080,076 B2
(45) **Date of Patent: *Sep. 18, 2018**

(54) HEADPHONE DEVICE

(71) Applicants: SINTAI OPTICAL (SHENZHEN) CO., LTD., Guang Ming New Zone, ShenZhen, Guandong Province (CN); ASIA OPTICAL CO., INC., Taichung (TW)

(72) Inventors: Takayuki Karasawa, Taichung (TW); Tomoya Takahashi, Taichung (TW); Masahiro Koike, Taichung (TW); Naofumi Imai, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,079

(22) Filed: Mar. 20, 2017

(65) Prior Publication Data

US 2017/0366893 A1 Dec. 21, 2017

(30) Foreign Application Priority Data

Jun. 17, 2016 (TW) ............................ 105119074 A

(51) Int. Cl.
*H04B 3/00* (2006.01)
*H04R 1/10* (2006.01)
(Continued)

(52) U.S. Cl.
CPC ......... *H04R 1/1075* (2013.01); *H04R 1/1008* (2013.01); *H04R 1/26* (2013.01);
(Continued)

(58) Field of Classification Search
CPC ........ H04R 5/033; H04R 1/1008; H04R 3/04; H04R 1/1016; H04R 1/26; H04R 3/14;
(Continued)

(56) References Cited

U.S. PATENT DOCUMENTS 7,995,778 B2 8/2011 Berardi et al.
2001/0031057 A1 10/2001 Pineau
(Continued)

FOREIGN PATENT DOCUMENTS

CN 2571094 Y 9/2003
CN 101351836 A 1/2009
(Continued)

OTHER PUBLICATIONS

Chinese language office action dated May 16, 2017, issued in application No. TW 105119074.
(Continued)

*Primary Examiner* — Norman Yu
(74) *Attorney, Agent, or Firm* — McClure, Qualey & Rodack, LLP

(57) ABSTRACT

A headphone device includes a container and a first electrical connector. The container includes a first loudspeaker disposed in the container, a second loudspeaker disposed in the container, and a first cross-feed loudspeaker disposed in the container. The first electrical connector is disposed on the container, and is electrically connected to the first loudspeaker, the second loudspeaker and the first cross-feed loudspeaker.

19 Claims, 10 Drawing Sheets

(51) Int. Cl.

| | |
|---|---|
| *H04R 1/20* | (2006.01) |
| *H04R 3/14* | (2006.01) |
| *H04R 1/26* | (2006.01) |
| *H04R 5/033* | (2006.01) |

(52) U.S. Cl.
CPC ................ *H04R 3/14* (2013.01); *H04R 5/033* (2013.01); *H04R 2201/105* (2013.01)

(58) Field of Classification Search
CPC ............. H04R 1/323; H04R 2205/022; H04R 1/2811; H04R 1/2857; H04R 2227/005; H04R 2420/07; H04R 2430/03; H04R 2460/13; H04R 3/12; H04R 1/02; H04R 1/1041; H04R 1/1066; H04R 1/2819; H04R 1/2842; H04R 1/345; H04R 2201/107; H04R 1/025; H04R 1/1033; H04R 1/1058; H04R 1/22; H04R 5/0335; G10L 21/038; G10L 19/167; H04S 7/301; H04S 1/007; H04S 7/305; H04S 1/005; H04S 2400/01; H04S 2420/07; H04S 7/304; H04S 7/03
USPC ..... 381/74, 300, 303, 103, 17, 345, 384, 58, 381/98, 1, 107, 150, 307, 322, 334, 380, 381/80, 94.3, 99; 700/94; 181/199
See application file for complete search history.

(56) References Cited

U.S. PATENT DOCUMENTS

| | | | | |
|---|---|---|---|---|
| 2006/0193481 | A1* | 8/2006 | Harvey ................ | H04R 1/1016 381/74 |
| 2012/0102629 | A1* | 5/2012 | Lott ........................ | A42B 3/166 2/410 |
| 2013/0077800 | A1* | 3/2013 | Pan .......................... | H04S 3/004 381/74 |
| 2015/0382100 | A1* | 12/2015 | Azmi ................... | H04R 1/1091 381/380 |
| 2016/0094929 | A1* | 3/2016 | Brannmark ............. | H04S 1/005 381/310 |
| 2016/0171962 | A1* | 6/2016 | Jenkins ................ | H04R 1/1083 381/71.6 |

FOREIGN PATENT DOCUMENTS

| | | | |
|---|---|---|---|
| CN | 103067827 | A | 4/2013 |
| JP | 49-028101 | U | 3/1975 |
| JP | 2005-354560 | A | 12/2005 |
| JP | 2013-142735 | A | 7/2013 |

OTHER PUBLICATIONS

Japanese language office action dated Feb. 6, 2018, issued in application No. JP 2017-079426.
English language translation of Japanese office action.

* cited by examiner

HEADPHONE DEVICE

CROSS REFERENCE TO RELATED APPLICATIONS

This application claims the benefit of Taiwan Patent Application No. 105119074, filed Jun. 17, 2016, the entirety of which is incorporated by reference herein.

BACKGROUND OF THE DISCLOSURE

Field of the Disclosure

The present disclosure relates to a headphone device, and more particularly to a multi-channel headphone device.

Description of the Related Art

A conventional multi-channel headphone includes a cover body, a bass channel loudspeaker, a plurality of single channel loudspeaker boxes, and a plurality of single channel loudspeakers. The single channel loudspeaker boxes are disposed in the cover body and correspond to the front direction and the rear direction of a user. The bass channel loudspeaker is also disposed in the cover body, and the cover body serves as a resonant box. The single channel loudspeakers are disposed in the single channel loudspeaker boxes. Therefore, two earphone units of the multi-channel headphone can collectively provide audio outputs of four channels and two bass channels.

However, a conventional multi-channel headphone can only provide simple audio output, and the loudspeakers are disposed on the same horizontal plane, so that it cannot implement a diversified listening environment and the sense of space of a big or a small sound field.

BRIEF SUMMARY OF THE DISCLOSURE

A headphone device is provided in this disclosure to solve the problems of the prior art, and the headphone device includes a container and a first electrical connector. The container includes a first loudspeaker disposed in the container, a second loudspeaker disposed in the container, and a first cross-feed loudspeaker disposed in the container. The first electrical connector is disposed on the container, and is electrically connected to the first loudspeaker, the second loudspeaker and the first cross-feed loudspeaker.

In some embodiments, the container further includes a first housing and a second housing, wherein the first loudspeaker, the first cross-feed loudspeaker and the first electrical connector are disposed in the first housing, and the second loudspeaker is disposed in the second housing.

In some embodiments, the second housing further includes a second cross-feed loudspeaker and a second electrical connector disposed in the second housing, and the second electrical connector are electrically connected to the second loudspeaker and the first cross-feed loudspeaker.

In some embodiments, the first housing further includes a third loudspeaker, and the first electrical connector is electrically connected to the third loudspeaker.

In some embodiments, the second housing further includes a fourth loudspeaker, and the second electrical connector is electrically connected to the fourth loudspeaker.

In some embodiments, the first housing further includes a first crossover electrically connected to the first loudspeaker, the third loudspeaker and the first electrical connector, and the second housing further includes a second crossover electrically connected to the second loudspeaker, the fourth loudspeaker and the second electrical connector.

In some embodiments, a distance between the center of the first loudspeaker and the center of the third loudspeaker is greater than twice a radius of the third loudspeaker.

In some embodiments, a distance between the center of the first loudspeaker and the center of the first cross-feed loudspeaker is greater than twice a radius of the first loudspeaker or a diameter of the first cross-feed loudspeaker.

In some embodiments, the first housing further includes a first layer structure, a first accommodating space, a first output channel, a first trench and an output side. The first loudspeaker is disposed in the first accommodating space and has a first output surface corresponding to the first output channel. The first output channel includes the first trench and is disposed in the first layer structure, and the first output channel extends from and surrounds the first loudspeaker, and the first output channel is connected to the output side In some embodiments, the first housing further includes a second output channel, and the first loudspeaker further includes a second output surface corresponding to the second output channel.

In some embodiments, the length of the first output channel is greater than the length of the second output channel, and the length of the first output channel is about 12.7 to 19.1 times the length of the second output channel.

In some embodiments, the first cross-feed loudspeaker has a cross-feed output surface corresponding to a cross-feed output channel. The container further includes a second accommodating space, and the first cross-feed loudspeaker is disposed in the second accommodating space.

In some embodiments, the length of the first output channel is greater than the length of a cross-feed output channel, and the length of the first output channel is about 1.6 to 2.5 times the length of the cross-feed output channel.

In some embodiments, the first housing further has a cover structure and a second layer structure. The second layer structure is disposed between the first layer structure and the cover structure. The first layer structure is disposed between the second layer structure and the output side. The first accommodating space and the second accommodating space are disposed in the second layer structure, and the first loudspeaker and the first cross-feed loudspeaker are disposed in the first layer structure. The second layer structure includes an opening portion, a protrusion portion and a first through hole. The cross-feed output channel extends in the second layer structure and the cover structure and extends through the second layer structure and the first layer structure to the output side. The opening portion corresponds to the first cross-feed loudspeaker. The cover structure includes a second trench corresponding to the opening portion, the protrusion portion and the first through hole. The cross-feed output channel extends along the opening portion, the second trench and the first through hole to the exterior of the second layer structure. The first layer structure includes a second through hole corresponding to the first through hole. The cross-feed output channel extends along the first through hole and the second through hole from the second layer structure and the first layer structure to the output side.

In some embodiments, a wall thickness of the container ranges from 15 mm to 23 mm.

In some embodiments, the headphone further includes an audio cable, and the audio cable includes a main audio source terminal, configured to connect to an audio source device; a first audio source terminal, electrically connected to the main audio source terminal, configured to connect to the first electrical connector; and a second audio source terminal, electrically connected to the main audio source terminal, configured to connect to the first electrical connector. The first audio source terminal and the second audio source terminal are selectively connected to the first electrical connector Both the left ear and the right ear of the user can receive the sounds of the right and left channels due to the configuration of the cross-feed loudspeaker when the user wears the headphone device of the disclosure. In addition, the time difference of the sounds can be adjusted because of the design of the protrusion portion, the lengths of the second trench and the third trench, and the shape of the route for transmitting sounds. The frequency characteristics can be adjusted because of the design of the ventilation hole and the first trench.

DETAILED DESCRIPTION OF THE ILLUSTRATIVE EMBODIMENTS

Figure 1A:
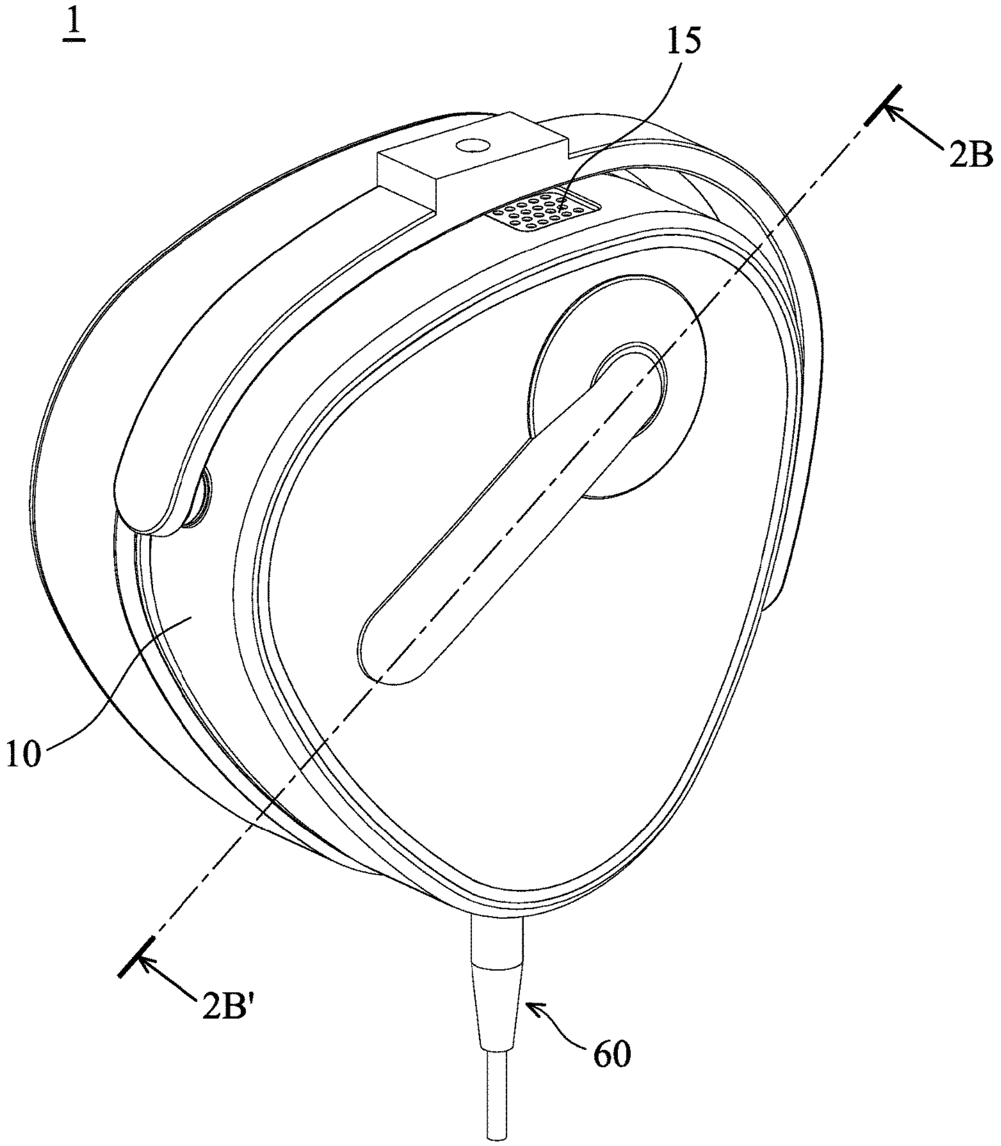
FIG. 1A shows an assembly diagram of a headphone device, in accordance with some embodiments.

A headphone device of the disclosure can include two headphones worn on the left ear and the right ear of the user. Please refer to FIG. 1A and FIG. 1B, which show a headphone 1 according to an embodiment of the present invention. The headphone 1 can be worn on the left ear or the right ear of the user. The headphone 1 includes a housing 10, a low vocal range loudspeaker 20, a low vocal range assistant channel 21 (first output channel), a high vocal range loudspeaker 30, a high vocal range assistant channel 31, a cross-feed loudspeaker 40 and a cross-feed output channel 41. The housing 10 includes an output side 19. The low vocal range loudspeaker 20 provides low-pitched sounds. At least one portion of low-pitched sounds go from the low vocal range loudspeaker 20, pass through the low vocal range assistant channel 21 and are output at the output side 19. The high vocal range loudspeaker 30 provides high-pitched sounds. At least one portion of the high-pitched sounds go from the high vocal range loudspeaker 30, pass through the high vocal range assistant channel 31 and are output at the output side 19. The cross-feed loudspeaker 40 provides a cross-feed sound. The cross-feed sound goes from the cross-feed loudspeaker 40, passes through the cross-feed output channel 41 and is output at the output side 19.

In an embodiment, the housing 10 includes a cover structure 13, a first layer structure 11 and a second layer structure 12. The second layer structure 12 is disposed between the first layer structure 11 and the cover structure 13. The first layer structure 11 is disposed between the second layer structure 12 and the output side 19. The low vocal range loudspeaker 20, the high vocal range loudspeaker 30 and the cross-feed loudspeaker 40 are disposed in the first layer structure 11. The low vocal range loudspeaker 20, the high vocal range loudspeaker 30 and the cross-feed loudspeaker 40 can be affixed by magnetic force or joining means.

In some embodiments, a wall thickness of the housing 10 is about 15 mm to 23 mm. In this embodiment, the wall thickness of the housing 10 is 19 mm. In some embodiments, the output side 19 can be an earmuff which is made of Polycarbonate plastic (PC) or Acrylonitrile Butadiene Styrene (ABS).

Figure 2A:
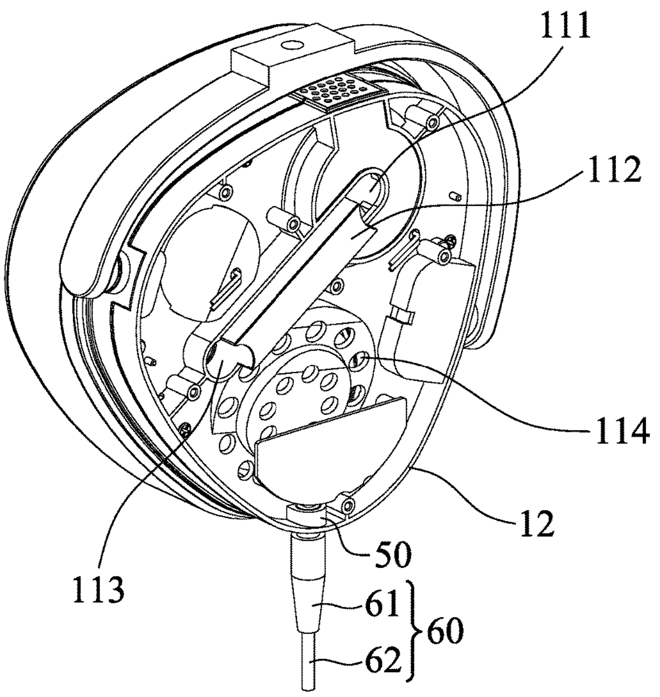
FIG. 2A shows detailed structures of a second layer structure, in accordance with some embodiments.
Figure 2B:
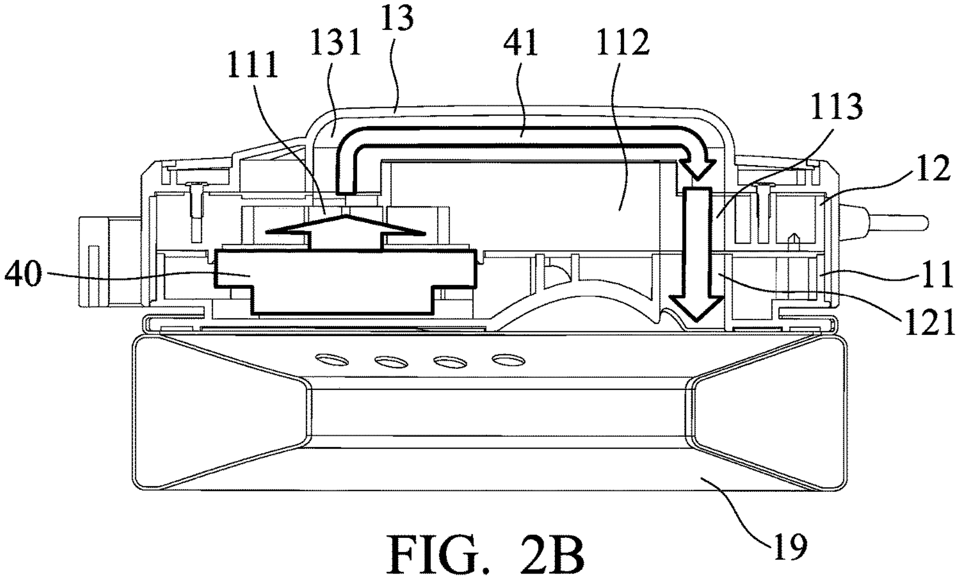
FIG. 2B shows a sectional view along a line 2B-2B' in FIG. 1A, in accordance with some embodiments.

Please refer to FIG. 2A and FIG. 2B. FIG. 2A shows detailed structures of the second layer structure 12, and FIG. 2B shows a sectional view along the line 2B-2B' in FIG. 1A. The cross-feed output channel 41 extends from the second layer structure 12 and passes through the second layer structure 12 and the first layer structure 11 to the output side 19. The second layer structure 12 includes an opening portion 111, a protrusion portion 112 and a first through hole 113. The opening portion 111 corresponds to the cross-feed loudspeaker 40. The cover structure 13 includes a second trench 131 corresponding to the opening portion 111, the protrusion portion 112 and the first through hole 113. In this embodiment, the second trench 131 is a straight trench.

The cross-feed output channel 41 extends from the opening portion 111, the second trench 131 and the first through hole 113 to the exterior of the second layer structure 12. The first layer structure 11 includes a second through hole 121 corresponding to the first through hole 113. The cross-feed output channel 41 extends along the first through hole 113 and the second through hole 121 from the second layer structure 12 and the first layer structure 11 to the output side 19. The length of the cross-feed output channel 41 from the opening portion 111 to the second through hole 121 is about 94 mm. In some embodiments, the length of the cross-feed output channel 41 from the opening portion 111 to the second through hole 121 ranges from 75.2 mm to 112.8 mm. The quality of the sounds of the headphone device 1 can be improved due to the length of the cross-feed output channel 41.

Please refer to FIG. 2A, in an embodiment, the second layer structure 12 further includes a plurality of ventilation holes 114 corresponding to the low vocal range loudspeaker 20.

The headphone 1 further includes an electrical connector 50 and audio cable 60. The electrical connector 50 is disposed in the housing 10. In an embodiment, the electrical connector 50 is disposed in the second layer structure 12. The electrical connector 50 can be a headphone jack electrically connected to the low vocal range loudspeaker 20, the high vocal range loudspeaker 30 and the cross-feed loudspeaker 40.

The audio cable 60 includes an audio source terminal 61 and a wire 64. The audio source terminal 61 is configured to be plugged into or connected to the electrical connector 50. An end of the wire 64 is disposed in the audio source terminal 61, and the other end of the wire 64 is electrically connected to an audio source device, such as a computer, a media player or a music player.

Figure 3A:
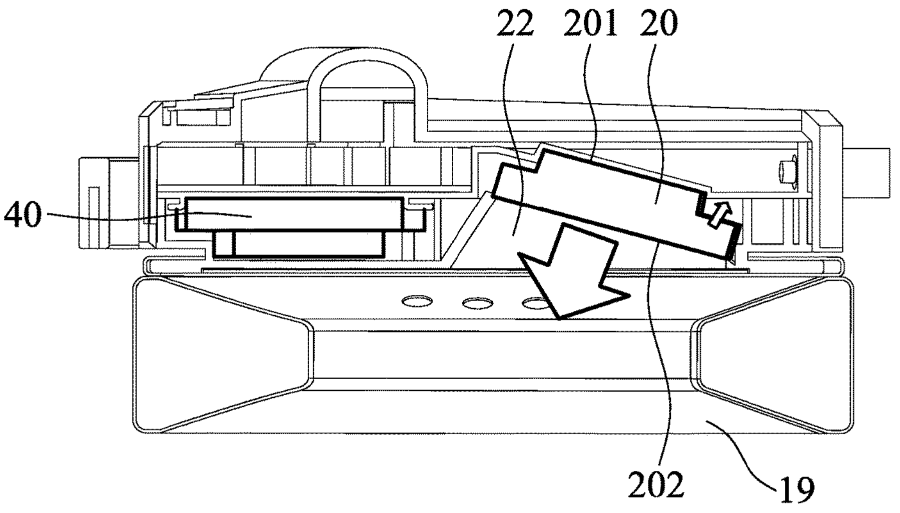
FIG. 3A shows a diagram illustrating a low vocal range loudspeaker and a low vocal range main channel, in accordance with some embodiments.
Figure 3B:
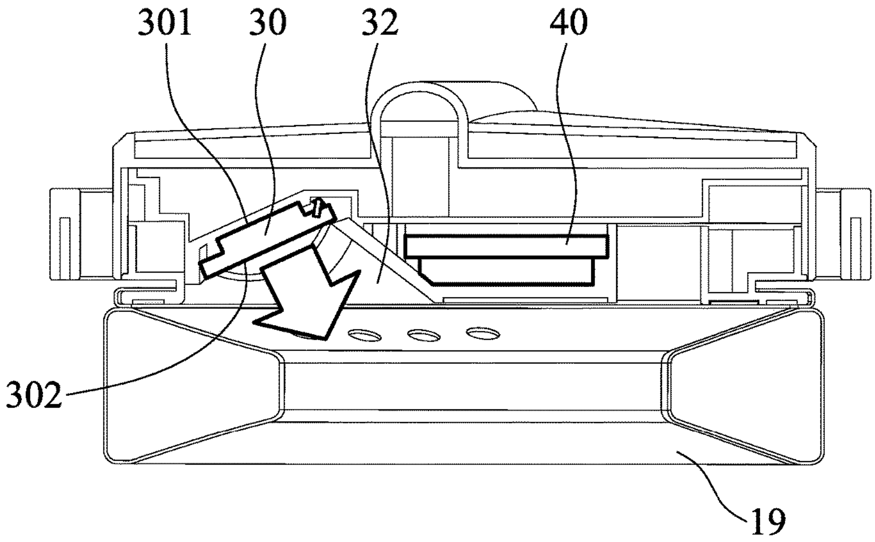
FIG. 3B shows a diagram illustrating a high vocal range loudspeaker and a high vocal range main channel, in accordance with some embodiments.
Figure 4A:
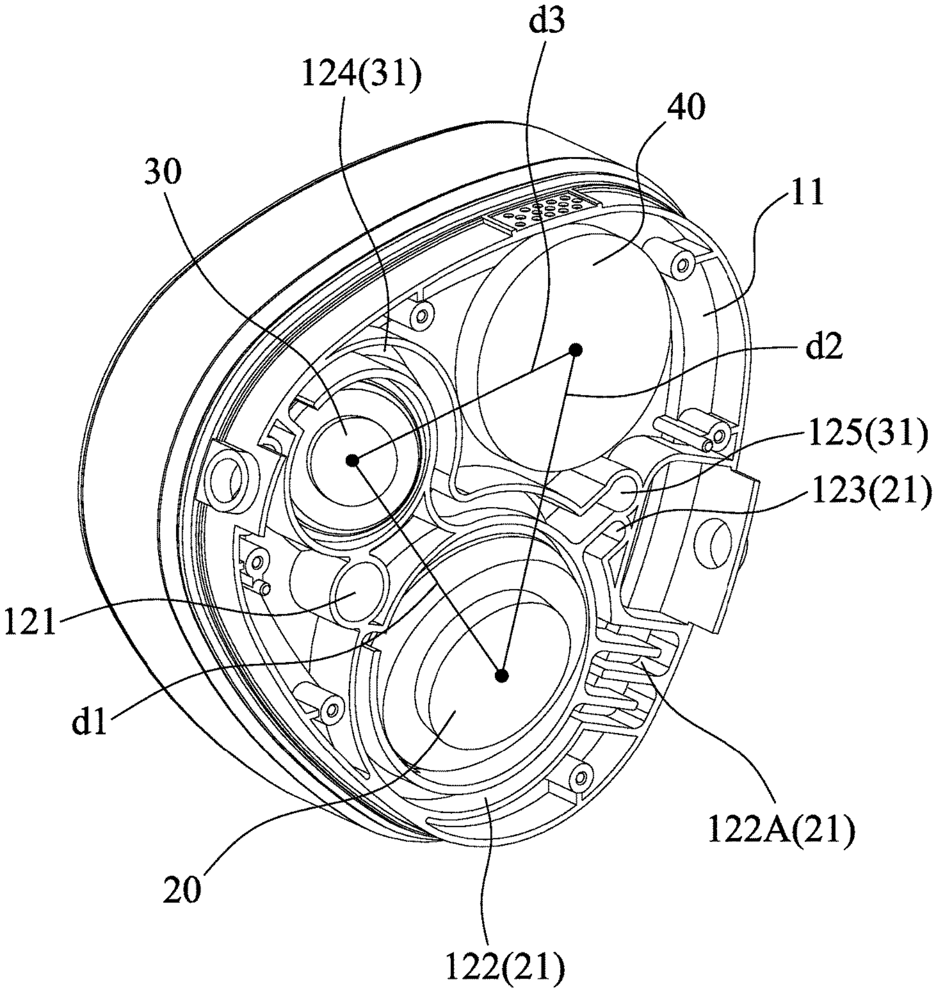
FIG. 4A and FIG. 4B shows detailed structures of a first layer structure, in accordance with some embodiments.

Please refer to FIG. 3A and FIG. 3B. The low vocal range loudspeaker 20 is aslant disposed and includes a first output surface 201 and a second output surface 202. The first output surface 201 corresponds to the low vocal range assistant channel 21 (first output channel, as shown in FIG. 4A). The second output surface 202 outputs at least one portion of low-pitched sounds through a low vocal range main channel 22 (a second output channel) toward the output side 19. In an embodiment, the first output surface 201 and the second output surface 202 are disposed adjacent to each other and the inclined angle between the first output surface 201 and the second output surface 202 is 10 degrees. The first output surface 201 and the second output surface 202 can generate the sounds with same frequency or different frequencies.

The high vocal range loudspeaker 30 includes a first output surface 301 and a second output surface 302. The first output surface 301 corresponds to the high vocal range assistant channel 31 (as shown in FIG. 4A). The second output surface 302 outputs at least one portion of high-pitched sounds through a high vocal range main channel 32 toward the output side 19. In an embodiment, the first output surface 301 and the second output surface 302 are disposed adjacent to each other and the inclined angle between the first output surface 301 and the second output surface 302 is 10 degrees. The first output surface 301 and the second output surface 302 can generate the sounds with same frequency or different frequencies. The inclined high vocal range loudspeaker 30 outputs at least one portion of high-pitched sounds through the high vocal range main channel 32 toward the output side 19.

A portion of the low-pitched sounds provided by the low vocal range loudspeaker 20 passes through the low vocal range assistant channel 21 and reaches the output side 19 due to the design of the inclined low vocal range loudspeaker 20. A portion of high-pitched sounds provided by the high vocal range loudspeaker 30 passes through the high vocal range assistant channel 31 (as shown in FIG. 4A) and reaches the output side 19 due to the design of the inclined high vocal range loudspeaker 30, so as to result in stereo sound effect.

In some embodiments, the length of the low vocal range main channel 22 ranges from about 9.2 mm to 14.4 mm. In this embodiment, the length of the low vocal range main channel 22 is 12 mm. The length of the low vocal range main channel 22 is defined as the average distance between the second output surface 202 and the output side 19.

In some embodiments, the length of the low vocal range assistant channel 21 ranges from about 152 mm to 229 mm. In this embodiment, the length of the low vocal range assistant channel 21 is about 190.5 mm. The length of the low vocal range assistant channel 21 is defined as the length of a first trench 122 and the length of a third through hole 123.

In some embodiments, the length of the low vocal range assistant channel 21 is greater than the length of the low vocal range main channel 22. The length of the low vocal range assistant channel 21 is about 12.7 to 19.1 times the length of the low vocal range main channel 22. In this embodiment, the length of the low vocal range assistant channel 21 is about 15.9 times the length of the low vocal range main channel 22.

In some embodiments, the length of the high vocal range main channel 32 ranges from about 9.6 mm to 14.4 mm. In this embodiment, the length of the high vocal range main channel 32 is about 12 mm. The length of the high vocal range main channel 32 is defined as the average distance between the second output surface 302 and the output side 19.

In some embodiments, the length of the high vocal range assistant channel 31 ranges from about 106 mm to 159 mm. In this embodiment, the length of the high vocal range assistant channel 31 is about 132.3 mm. The length of the high vocal range assistant channel 31 is defined as the length of a third trench 124 and the length of a fourth through hole 125.

In some embodiments, the length of the high vocal range assistant channel 31 is greater than the length of the high vocal range main channel 32. The length of the high vocal range assistant channel 31 is about 8.8 to 13.3 times the length of the high vocal range main channel 32. In this embodiment, the length of the high vocal range assistant channel 31 is 11 times the high vocal range main channel 32.

In some embodiments, the length of the low vocal range assistant channel 21 is greater than the length of the cross-feed output channel 41. The length of the cross-feed output channel 41 is less than the length of the high vocal range assistant channel 31. The length of the low vocal range assistant channel 21 is about 1.6 to 2.5 times the length of the cross-feed output channel 41. The length of the low vocal range assistant channel 21 is about 1.1 to 1.8 times the length of the high vocal range assistant channel 31. The length of the cross-feed output channel 41 is about 0.5 to 0.9 times the length of the high vocal range assistant channel 31.

The sound quality of the headphone 1 can be improved due to the above structures.

Figure 3C:
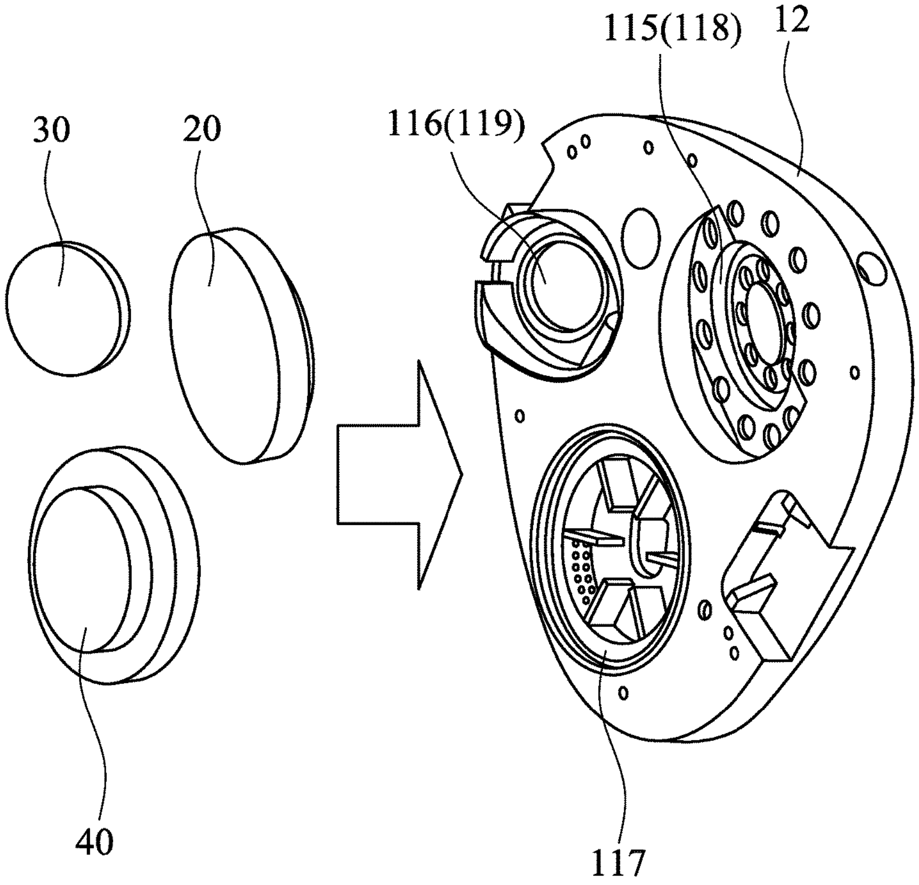
FIG. 3C shows a diagram illustrating a low vocal range loudspeaker, a high vocal range loudspeaker, and a cross-feed loudspeaker assembled to the second layer structure, in accordance with some embodiments.

Please refer to FIG. 3C, which shows the low vocal range loudspeaker 20, the high vocal range loudspeaker 30 and the cross-feed loudspeaker 40 assembled to the second layer structure 12. The second layer structure 12 includes a first accommodating space 115, a third accommodating space 116 and a second accommodating space 117. The first accommodating space 115 includes a first inclined surface 118, and the third accommodating space 116 includes a second inclined surface 119. The low vocal range loudspeaker 20 is embedded in the first accommodating space 115 and contacts the first inclined surface 118. The high vocal range loudspeaker 30 is embedded in the third accommodating space 116 and contacts the second inclined surface 119, and the cross-feed loudspeaker 40 is embedded in the second accommodating space 117.

Figure 4B:
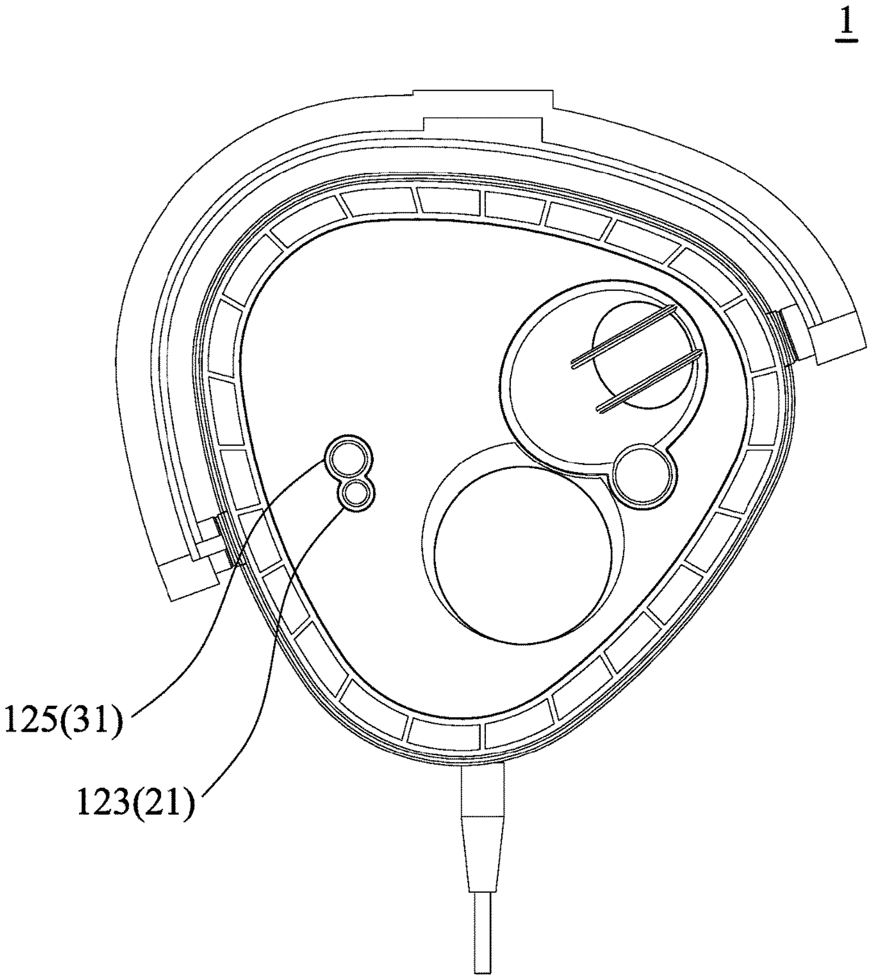

Please refer to FIG. 4A and FIG. 4B, which show detailed structures of the first layer structure 11. The low vocal range assistant channel 21 extends from the first layer structure 11 and passes through the first layer structure 11 toward the output side 19. The first layer structure 11 includes the first trench 122 and the third through hole 123. At least one portion of the first trench 122 extends around the low vocal range loudspeaker 20 and is connected to the third through hole 123. The low vocal range assistant channel 21 extends along the first trench 122 and the third through hole 123 to the exterior of the first layer structure 11.

In one embodiment, the first trench 122 includes a comb-shaped portion 122A. The comb-shaped portion 122A can provide a sound-delay effect.

Please refer to FIG. 4A and FIG. 4B. The first layer structure 11 includes the third trench 124 and the fourth through hole 125. At least one portion of the third trench 124 extends around the high vocal range loudspeaker 30 and is connected to the fourth through hole 125. The high vocal range assistant channel 31 extends along the third trench 124 and the fourth through hole 125 to the exterior of the first layer structure 11. In one embodiment, at least one portion of the third trench 124 surrounds the low vocal range loudspeaker 20.

In some embodiments, the diameter of the third through hole 123 ranges from about 3.2 mm to 4.8 mm. In this embodiment, the diameter of the third through hole 123 is 4 mm. In some embodiments, the diameter of the fourth through hole 125 ranges from about 4.8 mm to 7.2 mm. In this embodiment, the diameter of the fourth through hole 125 is 6 mm.

Furthermore, the diameter of the fourth through hole 125 is greater than 1.2 to 1.8 times the diameter of the third through hole 123. In this embodiment, the diameter of the fourth through hole 125 is 1.5 times the diameter of the third through hole 123.

Please refer to FIG. 4A and FIG. 4B. In this embodiment, the third through hole 123 is adjacent to the fourth through hole 125, the second through hole 121 is disposed between the low vocal range loudspeaker 20 and the high vocal range loudspeaker 30, and the low vocal range loudspeaker 20 is disposed between the second through hole 121 and the third through hole 123. In other words, the comb-shaped portion 122A, the second through hole 121, the third through hole 123 and the fourth through hole 125 are arranged around the low vocal range loudspeaker 20.

Please refer to FIG. 4A. In this embodiment, a radius of the low vocal range loudspeaker 20 ranges from about 16 mm to 24 mm, and the radius of the low vocal range loudspeaker 20 is about 20 mm in this embodiment. A radius of the high vocal range loudspeaker 30 ranges from about 9.2 mm to 13.8 mm, and the radius of the high vocal range loudspeaker 30 is about 11.5 mm in this embodiment. The radius of the cross-feed loudspeaker 40 ranges from about 16 mm to 24 mm, and the radius of the cross-feed loudspeaker 40 is about 20 mm in this embodiment.

A distance d1 between the center of the low vocal range loudspeaker 20 and the center of the high vocal range loudspeaker 30 is greater than two times the radius of the high vocal range loudspeaker 30. In this embodiment, the distance d1 is about 47.5 mm. A distance d3 between the center of the cross-feed loudspeaker 40 and the center of the high vocal range loudspeaker 30 is greater than two times the radius of the high vocal range loudspeaker 30. The distance d3 is about 45 mm in this embodiment. A distance d2 between the center of the low vocal range loudspeaker 20 and the center of the cross-feed loudspeaker 40 is greater than two times the radius of the low vocal range loudspeaker 20 or the radius of the cross-feed loudspeaker 40. The distance d2 is about 51.6 mm in this embodiment. The sound quality of the headphone 1 is improved due to the above structures.

No matter whether the user is using his/her left ear or his/her right ear, the user can receive the sounds of the right and left channels due to the configuration of the cross-feed loudspeaker when the user wears the headphone device of the disclosure. In addition, the time difference of the sounds can be adjusted because of the design of the protrusion portion, the lengths of the second trench and the third trench, and the shape of the route for transmitting sounds. The frequency characteristics can be adjusted because of the design of the ventilation hole and the first trench.

In one embodiment, when the low vocal range loudspeaker 20 and the high vocal range loudspeaker 30 operate at a high volume, the cross-feed loudspeaker 40 operates at a low volume. Conversely, when the low vocal range loudspeaker 20 and the high vocal range loudspeaker 30 operate at a low volume, the cross-feed loudspeaker 40 operates at a high volume, so as to provide stereophonic sound.

Figure 1B:
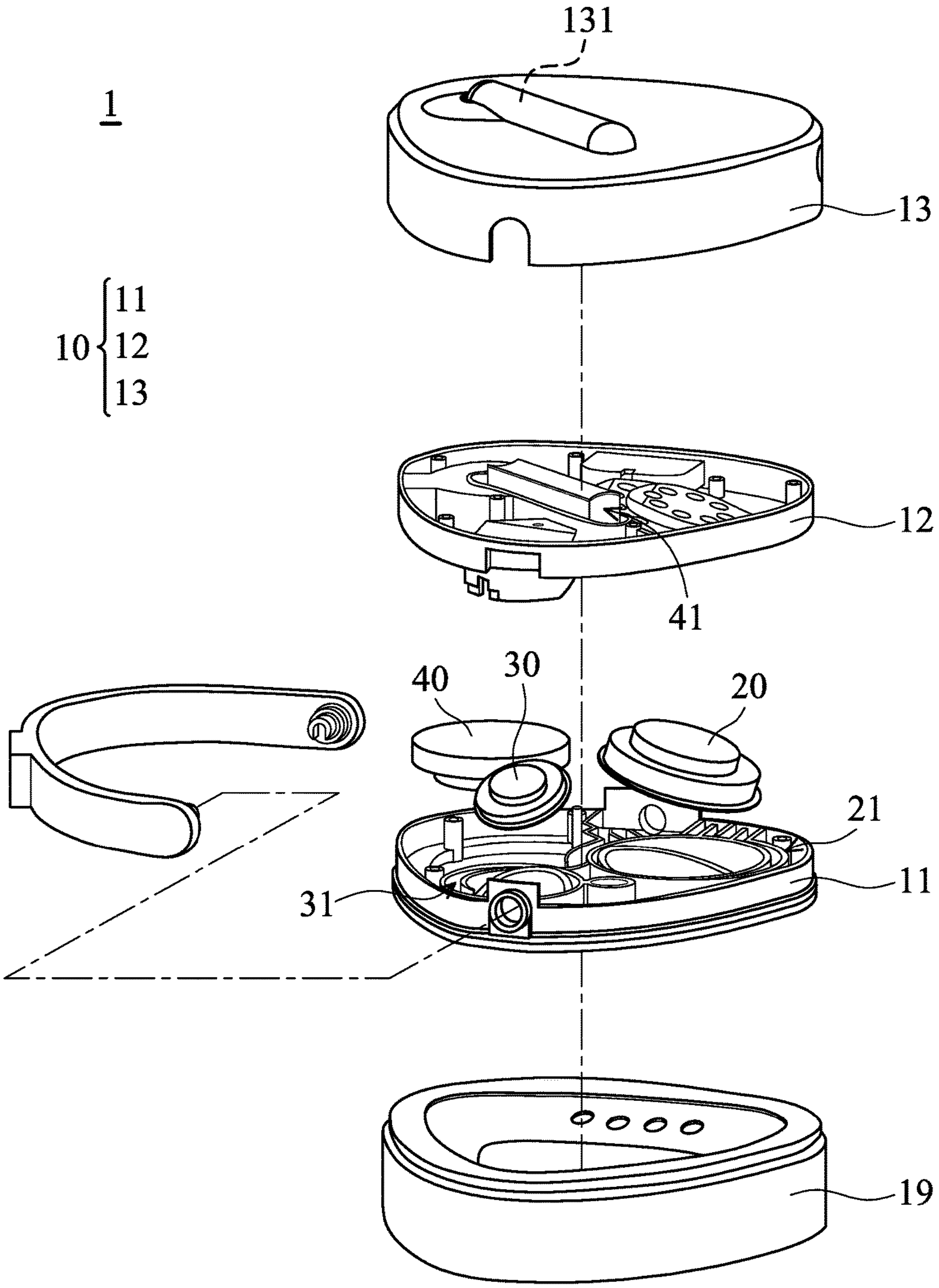
FIG. 1B shows an exploded diagram of a headphone device, in accordance with some embodiments.

Please refer to FIG. 1A. In one embodiment, the headphone device further includes a vent 15 disposed on a side of the housing 10, and the vent 15 communicates with the air, so that the sounds seem more natural to the user.

Figure 5A:
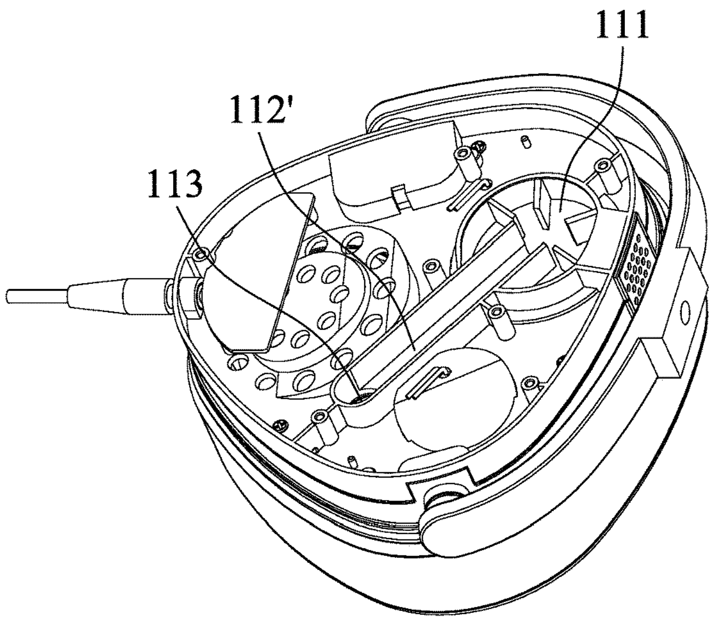
FIG. 5A and FIG. 5B shows a perspective diagram of a headphone device, in accordance with another embodiment.
Figure 5B:
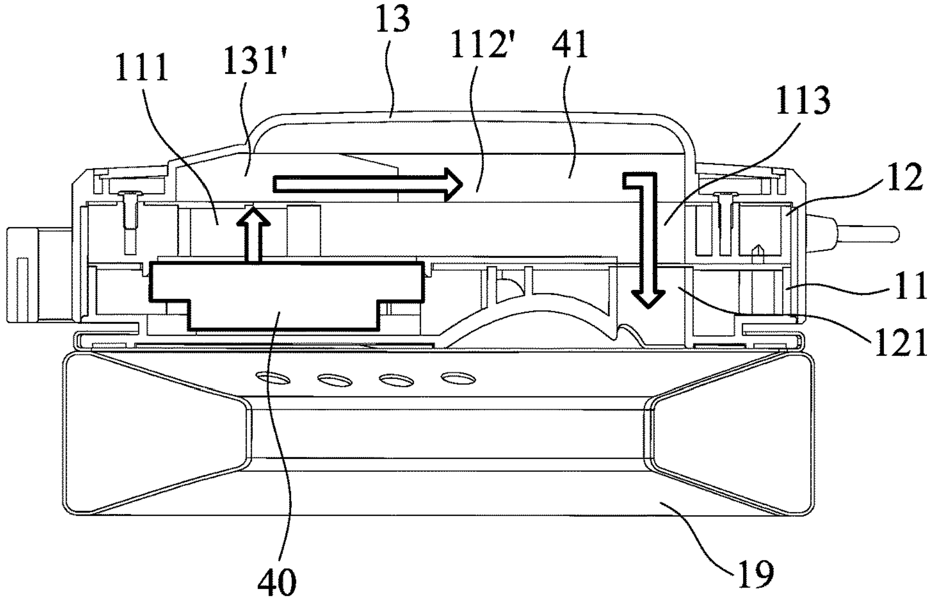

Please refer to FIG. 5A and FIG. 5B which show a headphone device according to another embodiment of the invention. The cross-feed output channel 41 extends in the second layer structure 12 and the cover structure 13 and passes through the second layer structure 12 and the first layer structure 11 toward the output side 19. The second layer structure 12 includes the opening portion 111, a second trench 112' and the first through hole 113. The opening portion 111 corresponds to the cross-feed loudspeaker 40, and the second trench 112' communicates with opening portion 111 and the first through hole 113. The cross-feed output channel 41 extends along the opening portion 111, the second trench 112' and the first through hole 113 to the exterior of the second layer structure 12. The cover structure 13 includes a sound chamber 131' connected to the opening portion 111 and the second trench 112'. The cross-feed output channel 41 extends along the opening portion 111, the sound chamber 131', the second trench 112' and the first through hole 113 to the exterior of the second layer structure 12. The sound chamber 131' is used for adjusting the frequency characteristics.

Figure 6:
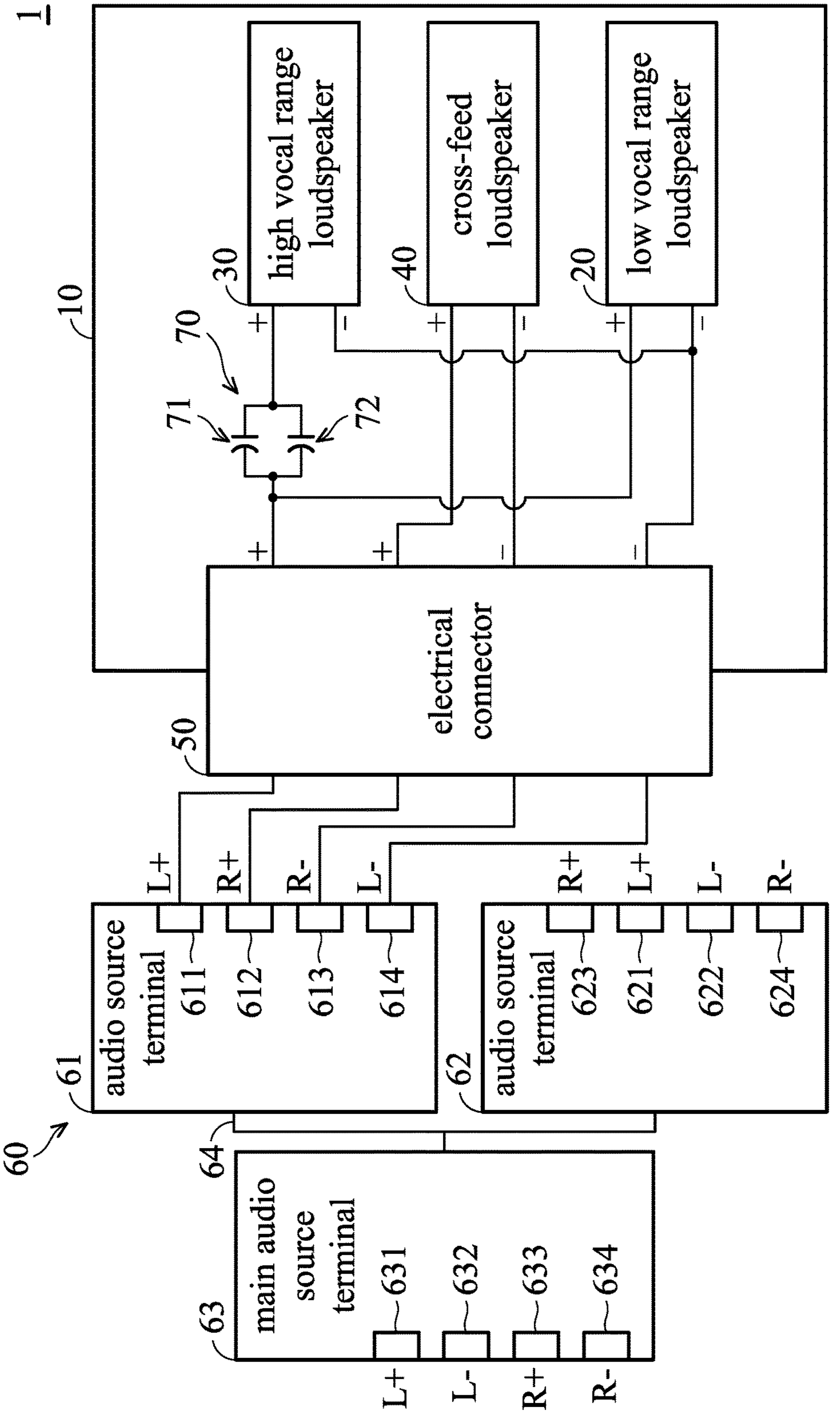
FIG. 6 shows a circuit diagram of a headphone device, in accordance with some embodiments.
Figure 7:
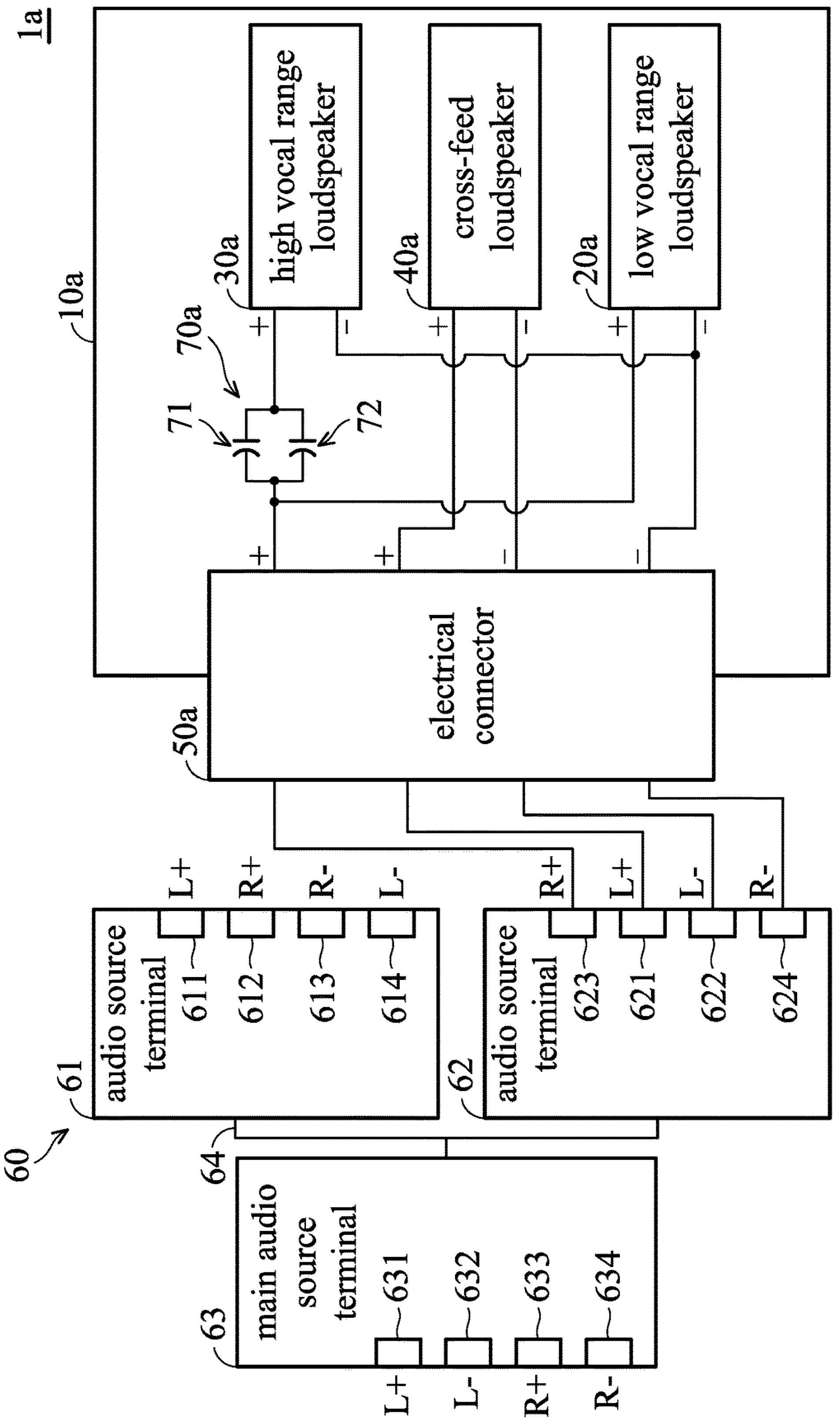
FIG. 7 shows a circuit diagram of a headphone device, in accordance with another embodiment.

FIG. 6 shows a circuit diagram of the headphone 1 of the invention. FIG. 7 shows a circuit diagram of a headphone 1*a* of the invention. In this embodiment, the headphone 1 (first earphone) of the headphone device is a left earphone configured to be disposed on the left ear of the user. The headphone 1*a* (second earphone) of the headphone device is a right earphone configured to be disposed on the right ear of the user.

In this embodiment, the structure of the headphone 1*a* is symmetric to the structures of the headphone 1. If the headphone device is a headset, there is a head-worn mechanism (not shown in the figures) for connecting the headphone 1 and headphone 1*a*, so as to make it easy for the user to wear the headphone device on his/her head. The headphone device includes a container, which includes the housing 10 of the headphone 1 or the housing 10*a* of the headphone 1*a*.

The electrical connector 50 (first electrical connector) is electrically connected to the low vocal range loudspeaker 20 (first loudspeaker) and the high vocal range loudspeaker 30 (third loudspeaker). The electrical connector 50 can be a headphone jack for being plugged into or connected by the audio cable 60.

The audio cable 60 further includes an audio source terminal 62 and a main audio source terminal 63. The main audio source terminal 63 is configured to be plugged into or connected to an audio source device for receiving a left channel source signal and a right channel source signal of an audio source. The main audio source terminal 63 includes a left channel positive terminal 631, a left channel negative terminal 632, a right channel positive terminal 633 and a right channel negative terminal 634. When the main audio source terminal 63 is plugged into or connected to the audio source device, the left channel positive terminal 631, the left channel negative terminal 632, the right channel positive terminal 633 and the right channel negative terminal 634 are electrically connected to the audio source device.

The left channel positive terminal 631 and the left channel negative terminal 632 are configured to transmit the left channel source signal to headphones 1 and 1*a*. The right channel positive terminal 633 and the right channel negative terminal 634 are configured to transmit the right channel source signal to headphones 1 and 1*a*.

The audio source terminal 61 is configured to transmit an audio signal. In this embodiment, the audio signal transmitted by the audio source terminal 61 is the left channel source signal. The electrical connector 50 receives the audio signal transmitted from the audio source terminal 61, and the left channel source signal is transmitted from the electrical connector 50 to the low vocal range loudspeaker 20 and the high vocal range loudspeaker 30.

The audio source terminal 61 includes a left channel positive terminal 611, a left channel negative terminal 614, a right channel positive terminal 612 and a right channel negative terminal 613. The left channel positive terminal 611 is connected to the left channel positive terminal 631 through the wire 64. The left channel negative terminal 614 is connected to the left channel negative terminal 632 through the wire 64. The right channel positive terminal 612 is connected to the right channel positive terminal 633 through the wire 64. The right channel negative terminal 613 is connected to the right channel negative terminal 634 through the wire 64.

In addition, the left channel positive terminal 611 is electrically connected to the low vocal range loudspeaker 20 and the high vocal range loudspeaker 30 through the electrical connector 50. The left channel negative terminal 614 is electrically connected to the low vocal range loudspeaker 20 and the high vocal range loudspeaker 30 through the electrical connector 50. The right channel positive terminal 612 is connected to the cross-feed loudspeaker 40 through the electrical connector 50. The right channel negative terminal 613 is connected to the cross-feed loudspeaker 40 through the electrical connector 50.

The headphone 1 further includes a crossover 70 (first crossover) electrically connected to the low vocal range loudspeaker 20, the high vocal range loudspeaker 30 and the electrical connector 50. The crossover 70 includes a first capacitor 71 and a second capacitor 72. The first capacitor 71 and the second capacitor 72 are connected to each other in parallel. A capacitance of the first capacitor 71 ranges from about 0.37 μf to 0.57 μf, and a capacitance of the second capacitor 72 ranges from about 0.17 μf to 0.27 μf. In this embodiment, the capacitance of the first capacitor 71 is about 0.47 μf, and the capacitance of the second capacitor 72 is about 0.22 μf.

The high vocal range loudspeaker 30 can generate sound according to a signal whose frequency is over a crossover frequency, and the low vocal range loudspeaker 20 can generate sound according to a signal whose frequency is below the crossover frequency using the crossover 70. In this embodiment, the crossover frequency is 4.2 kHz.

As shown in FIG. 7, a low vocal range loudspeaker 20*a* (second loudspeaker), a high vocal range loudspeaker 30*a* (fourth loudspeaker) and cross-feed loudspeaker 40*a* (second cross-feed loudspeaker) are disposed in a housing 10*a* (second housing) of the headphone 1*a*. An electrical connector 50*a* (second electrical connector) is disposed in the housing 10*a* and is electrically connected to the low vocal range loudspeaker 20*a* and the high vocal range loudspeaker 30*a*. The headphone 1*a* further includes a crossover 70*a* (second crossover) electrically connected to the low vocal range loudspeaker 20*a*, the high vocal range loudspeaker 30*a* and the electrical connector 50*a*.

The electrical connector 50*a* can be a headphone jack configured to be plugged into or connected by the audio source terminal 62. The audio source terminal 62 is configured to transmit an audio signal. In this embodiment, the audio signal transmitted by the audio source terminal 62 is the right channel source signal. The electrical connector 50*a* receives the audio signal transmitted from the audio source terminal 62, and the right channel source signal is transmitted from the electrical connector 50*a* to the low vocal range loudspeaker 20*a* and the high vocal range loudspeaker 30*a*.

The audio source terminal 62 includes a left channel positive terminal 621, a left channel negative terminal 622, a right channel positive terminal 623 and a right channel negative terminal 624. The left channel positive terminal 621 is connected to the left channel positive terminal 631 through the wire 64. The left channel negative terminal 622 is connected to the left channel negative terminal 632 through the wire 64. The right channel positive terminal 623 is connected to the right channel positive terminal 633 through the wire 64. The right channel negative terminal 624 is connected to the right channel negative terminal 634 through the wire 64.

Furthermore, the left channel positive terminal 621 is electrically connected to the cross-feed loudspeaker 40*a* through the electrical connector 50*a*. The left channel negative terminal 622 is connected to the cross-feed loudspeaker 40*a* through the electrical connector 50*a*. The right channel positive terminal 623 is connected to the low vocal range loudspeaker 20*a* and the high vocal range loudspeaker 30*a* through the electrical connector 50*a*. The right channel negative terminal 624 is connected to the low vocal range loudspeaker 20*a* and the high vocal range loudspeaker 30*a* through the electrical connector 50*a*.

As shown in FIG. 6 and FIG. 7, in this embodiment, the left channel positive terminal 631 and the left channel negative terminal 632 of the main audio source terminal 63 are electrically connected to the low vocal range loudspeaker 20 and the high vocal range loudspeaker 30 of the headphone 1 and the cross-feed loudspeaker 40*a* of the headphone 1*a*. In addition, the right channel positive terminal 633 and the right channel negative terminal 634 of the main audio source terminal 63 are electrically connected to the low vocal range loudspeaker 20*a* and the high vocal range loudspeaker 30*a* of the headphone 1*a* and the cross-feed loudspeaker 40 of the headphone 1. Therefore, the audio signal of the audio cable 60 plugged into or connected to the headphone 1 is also transmitted to the cross-feed loudspeaker 40*a* of the headphone 1*a*, and the audio signal of the audio cable 60 plugged into or connected to the headphone 1*a* is also transmitted to the cross-feed loudspeaker 40 of the headphone 1. Consequently, both the left ear and the right ear of the user can receive the sounds of the right and left channels due to the configuration of the cross-feed loudspeaker 40, 40*a* when the user wears the headphone device of the invention.

Moreover, because the audio signals of the left channel and the right channel are transmitted to the headphone 1 and the headphone 1*a* at the same time by the audio cable 60, there is no need to place the wire in a head-worn mechanism (not shown in the figures) of a headset. In addition, the audio source terminal 61 of the audio cable 60 can be plugged into or connected to the electrical connector 50*a* of the headphone 1*a*, and the audio source terminal 62 can be plugged into or connected to the electrical connector 50 of the headphone 1, and this configuration does not result in a defect that causes the headphone 1 and the headphone 1*a* to not transmit the audio.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A headphone device, comprising:
a container, comprising:
a first housing, disposed in the container, comprising:
a first output channel;
a second output channel;
a first layer structure;
a first accommodating space;
a first trench;
an output side; and
a second housing;
a first loudspeaker, disposed in the first accommodating space, comprising:
a first output surface corresponding to the first output channel;
a second output surface corresponding to the second output channel; and
a second loudspeaker, disposed in the container;
a first cross-feed loudspeaker disposed in the container; and
a first electrical connector, disposed in the container and electrically connected to the first loudspeaker, the second loudspeaker and the first cross-feed loudspeaker;
wherein the first loudspeaker, the first cross-feed loudspeaker and the first electrical connector are disposed in the first housing, and the second loudspeaker is disposed in the second housing;
wherein the first output channel comprises the first trench and is disposed in the first layer structure, and the first output channel extends from and surrounds the first loudspeaker, and the first output channel is connected to the output side.

2. The headphone device as claimed in claim 1, wherein the second housing further comprises a second cross-feed loudspeaker and a second electrical connector disposed in the second housing, and the second electrical connector are electrically connected to the second loudspeaker and the first cross-feed loudspeaker.

3. The headphone device as claimed in claim 2, wherein the first housing further comprises a third loudspeaker, and the first electrical connector is electrically connected to the third loudspeaker, wherein the second housing further comprises a fourth loudspeaker, and the second electrical connector is electrically connected to the fourth loudspeaker.

4. The headphone device as claimed in claim 3, wherein the first housing further comprises a first crossover electrically connected to the first loudspeaker, the third loudspeaker and the first electrical connector, and the second housing further comprises a second crossover electrically connected to the second loudspeaker, the fourth loudspeaker and the second electrical connector.

5. The headphone device as claimed in claim 3, wherein a distance between a center of the first loudspeaker and a center of the third loudspeaker is greater than twice the radius of the third loudspeaker.

6. The headphone device as claimed in claim 1, wherein a distance between the center of the first loudspeaker and the center of the first cross-feed loudspeaker is greater than twice the radius of the first loudspeaker or a diameter of the first cross-feed loudspeaker.

7. The headphone device as claimed in claim 1, wherein a distance between the center of the first loudspeaker and the center of the first cross-feed loudspeaker is greater than twice the radius of the first loudspeaker or a diameter of the first cross-feed loudspeaker.

8. The headphone device as claimed in claim 2, wherein a distance between the center of the first loudspeaker and the center of the first cross-feed loudspeaker is greater than twice the radius of the first loudspeaker or a diameter of the first cross-feed loudspeaker.

9. The headphone device as claimed in claim 3, wherein a distance between the center of the first loudspeaker and the center of the first cross-feed loudspeaker is greater than twice the radius of the first loudspeaker or a diameter of the first cross-feed loudspeaker.

10. The headphone device as claimed in claim 1, wherein the length of the first output channel is greater than the length of the second output channel, and the length of the first output channel is about 12.7 to 19.1 times the length of the second output channel.

11. The headphone device as claimed in claim 1, wherein the first cross-feed loudspeaker has a cross-feed output surface corresponding to a cross-feed output channel;
wherein the container further comprises a second accommodating space, and the first cross-feed loudspeaker is disposed in the second accommodating space.

12. The headphone device as claimed in claim 10, wherein the length of the first output channel is greater than the length of a cross-feed output channel, and the length of the first output channel is about 1.6 to 2.5 times the length of the cross-feed output channel.

13. The headphone device as claimed in claim 10, wherein the first housing further has a cover structure and a second layer structure, the second layer structure is disposed between the first layer structure and the cover structure, the first layer structure is disposed between the second layer structure and the output side, the first and second accommodating spaces are disposed in the second layer structure, and the first loudspeaker and the first cross-feed loudspeaker are disposed in the first layer structure, wherein the second layer structure comprises an opening portion, a protrusion portion and a first through hole, the cross-feed output channel extends in the second layer structure and the cover structure and extends through the second layer structure and the first layer structure to the output side, the opening portion corresponds to the first cross-feed loudspeaker, the cover structure comprises a second trench corresponding to the opening portion, the protrusion portion and the first through hole, the cross-feed output channel extends along the opening portion, the second trench and the first through hole to the exterior of the second layer structure, the first layer structure comprises a second through hole corresponding to the first through hole, the cross-feed output channel extends along the first through hole and the second through hole from the second layer structure and the first layer structure to the output side.

14. The headphone device as claimed in claim 1, wherein a wall thickness of the container ranges from 15 mm to 23 mm.

15. The headphone device as claimed in claim 2, further comprising an audio cable, the audio cable comprising:
a main audio source terminal, configured to connect to an audio source device;
a first audio source terminal, electrically connected to the main audio source terminal, configured to connect to the first electrical connector or the second electrical connector; and a second audio source terminal, electrically connected to the main audio source terminal, to connect to the first electrical connector or the second electrical connector;

wherein one of the first audio source terminal and the second audio source terminal is connected to the first electrical connector, and the other of the first audio source terminal and the second audio source terminal is connected to the second electrical connector.

16. The headphone device as claimed in claim 3, further comprising an audio cable, the audio cable comprising:

a main audio source terminal, configured to connect to an audio source device;

a first audio source terminal, electrically connected to the main audio source terminal, configured to connect to the first electrical connector or the second electrical connector; and a second audio source terminal, electrically connected to the main audio source terminal, to connect to the first electrical connector or the second electrical connector;

wherein one of the first audio source terminal and the second audio source terminal is connected to the first electrical connector, and the other of the first audio source terminal and the second audio source terminal is connected to the second electrical connector.

17. A headphone device, comprising:

a container, comprising:

a first loudspeaker, disposed in the container;

a second loudspeaker, disposed in the container; and a first cross-feed loudspeaker disposed in the container;

a first housing; comprising:

a first layer structure;

a first accommodating space;

a first output channel;

a first trench; and an output side; and a second housing; and a first electrical connector, disposed in the container and electrically connected to the first loudspeaker, the second loudspeaker and the first cross-feed loudspeaker;

wherein the first loudspeaker is disposed in the first accommodating space and has a first output surface corresponding to the first output channel, and the first output channel comprises the first trench and is disposed in the first layer structure, wherein the first output channel extends from and surrounds the first loudspeaker, and the first output channel is connected to the output side, wherein the first loudspeaker, the first cross-feed loudspeaker and the first electrical connector are disposed in the first housing, and second loudspeaker is disposed in the second housing, wherein the length of the first output channel is greater than the length of the second output channel, and the length of the first output channel is about 12.7 to 19.1 times the length of the second output channel, wherein the first housing further has a cover structure and a second layer structure, the second layer structure is disposed between the first layer structure and the cover structure, the first layer structure is disposed between the second layer structure and the output side, the first and second accommodating spaces are disposed in the second layer structure, and the first loudspeaker and the first cross-feed loudspeaker are disposed in the first layer structure, wherein the second layer structure comprises an opening portion, a protrusion portion and a first through hole, the cross-feed output channel extends in the second layer structure and the cover structure and extends through the second layer structure and the first layer structure to the output side, the opening portion corresponds to the first cross-feed loudspeaker, the cover structure comprises a second trench corresponding to the opening portion, the protrusion portion and the first through hole, the cross-feed output channel extends along the opening portion, the second trench and the first through hole to the exterior of the second layer structure, the first layer structure comprises a second through hole corresponding to the first through hole, the cross-feed output channel extends along the first through hole and the second through hole from the second layer structure and the first layer structure to the output side.

18. The headphone device as claimed in claim 17, wherein a distance between the center of the first loudspeaker and the center of the first cross-feed loudspeaker is greater than twice the radius of the first loudspeaker or a diameter of the first cross-feed loudspeaker.

19. The headphone device as claimed in claim 17, wherein a wall thickness of the container ranges from 15 mm to 23 mm.

* * * * *